United States Patent [19]

Kindl et al.

[11] 3,750,296

[45] Aug. 7, 1973

[54] PRECISION MEASURING DEVICE HAVING TWO SCALES

[75] Inventors: George F. Kindl, Newington; Orean E. Michaud, Bristol, both of Conn.

[73] Assignee: Pratt & Whitney Inc., West Hartford, Conn.

[22] Filed: Sept. 9, 1971

[21] Appl. No.: 178,897

[52] U.S. Cl. .............................. 33/166, 33/164 R
[51] Int. Cl. ............................................ G01b 3/18
[58] Field of Search ................... 33/164 R, 164 D, 33/166, 163, 165

[56] References Cited
UNITED STATES PATENTS

| | | | |
|---|---|---|---|
| 902,493 | 10/1908 | Jaques | 33/166 |
| 1,254,607 | 1/1918 | Kock | 33/166 |
| 1,440,824 | 1/1923 | Fullmer | 33/166 |

Primary Examiner—Robert B. Hull
Assistant Examiner—Richard R. Stearns
Attorney—Radford W. Luther

[57] ABSTRACT

A micrometer has a frame, including a hub portion, with a threaded spindle mounted for longitudinal movement. The spindle is longitudinally displaced by a rotatable drive member mounted in the frame in threaded engagement with the spindle. A thimble is secured to the spindle for longitudinal movement over the hub portion of the frame. First and second scales, graduated in a first unit of measurement, are respectively imprinted on the drive member and the hub portion; and the third scale and a vernier scale, graduated in a second unit of measurement, are respectively imprinted on the hub portion and the thimble. The micrometer permits dual readout of physical dimensions.

3 Claims, 4 Drawing Figures

PATENTED AUG 7 1973 3,750,296

PRECISION MEASURING DEVICE HAVING TWO SCALES

BACKGROUND OF THE INVENTION

This invention relates to precision screw assemblies, and more particularly to precision gages, such as micrometers and depth gages.

Heretofore, precision gages have includes a scale calibrated in either English or metric units of measurement. Hence, when using prior art precision screw assemblies calibrated in a unit other than that in which a reading is desired, it is necessary for a user to convert the reading to the desired unit.

SUMMARY OF THE INVENTION

The invention provides a precision screw assembly capable of precisely measuring physical dimensions and furnishing a reading of these dimensions in at least two units of measurement, such as English or metric units. Hence, in utilizing a device according to the invention, it is unnecessary to make conversions from one unit to another since the invention provides for direct dual readout.

A preferred embodiment of the invention incorporates a threaded spindle mounted for longitudinal movement within a frame and a rotatable member in engagement with the threads of the spindle to axially move the spindle relative to the frame. A thimble is secured to the spindle for movement over a calibrated segment of the frame which includes a scale graduated in a first unit, and a second scale graduated in a second unit. A third scale, graduated in the first unit, is imprinted on the rotatable member, and a venier scale, graduated in the second unit, is provided on the thimble.

Accordingly, it is a primary object of the invention to provide a precision measuring device adapted to yield a reading of a physical dimension in at least two units of measurement.

DETAILED DESCRIPTION OF PREFERRED EMBODIMENT

Figure 1:
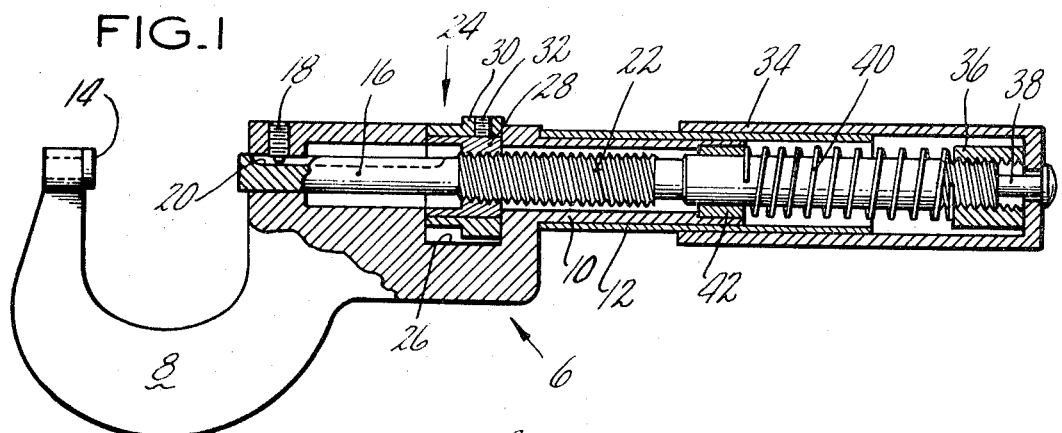
FIG. 1 is a side elevation partly in section of a micrometer in accordance with the invention.

Referring to FIG. 1, there is shown a micrometer according to the invention. The micrometer includes a frame 6 having a U-shaped portion 8, a hub portion 10, and a sleeve 12, secured in coaxial fashion over the hub portion 10 and extending therebeyond. To the U-shaped portion 8 of the frame 6 is attached an anvil 14 in axial alignment with a spindle 16. The spindle 16 is mounted within the frame 6 such that it is longitudinally movable toward and away from the anvil 14. The spindle 16 is constrained against rotation relative to the frame by a screw dowel 18 which depends from the frame 6 into a key way 20 on the outer periphery of the spindle 16. A plurality of threads 22 are formed on an intermediate portion of the spindle 16 and are engagable by a rotatable drive nut member, generally shown at 24. The drive member 24 is rotatable within a cavity 26 in the frame 6 and is constituted by an inner threaded member 28 and an outer member 30 embracing the inner member 28 in concentric relationship thereto. The outer member 30 may be rotatively displaced with respect to the inner member 28 (for zeroing in the micrometer) by means of a plurality of radially arranged set screws 32.

At the right end of the micrometer, a thimble 34 is coaxially mounted with respect to the sleeve 12 for sliding movement thereover. The right end of the spindle 16 threadably engages a nut 36 which is maintained in abutting relationship to the thimble 34 by screw 38. Hence, it will be appreciated that the spindle and the thimble constitute a rigid assembly and are thereby movable in unison. The nut 36 serves as a seat for compression spring 40 coiled about the spindle 16 and having its other end seated against a bearing 42 in which the spindle 16 is guided. The function of the compression spring 40 is to maintain the rear face of the rotatable drive member 24 in contact with the rear vertical face of cavity 26, and to eliminate backlash between the rotatable drive member 24 and the spindle 16.

Figure 2:
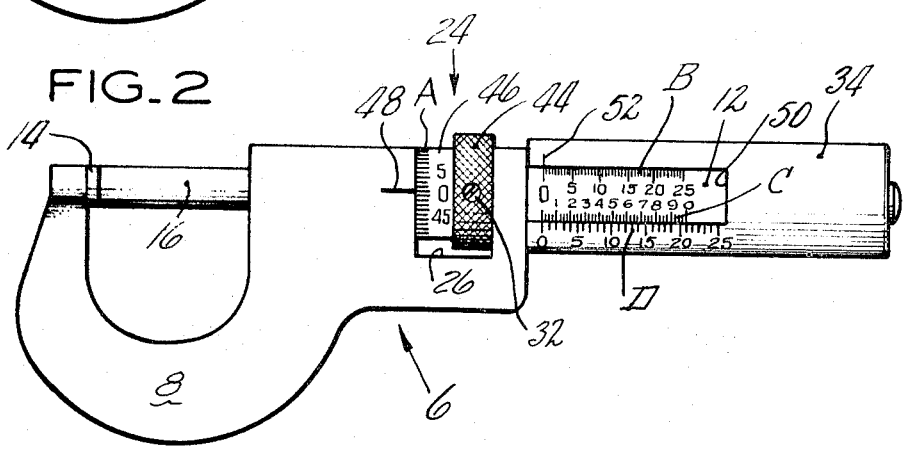
FIG. 2 is a side elevation of the micrometer of FIG. 1, wherein the face of the spindle is in contact with the anvil.
Figure 3:
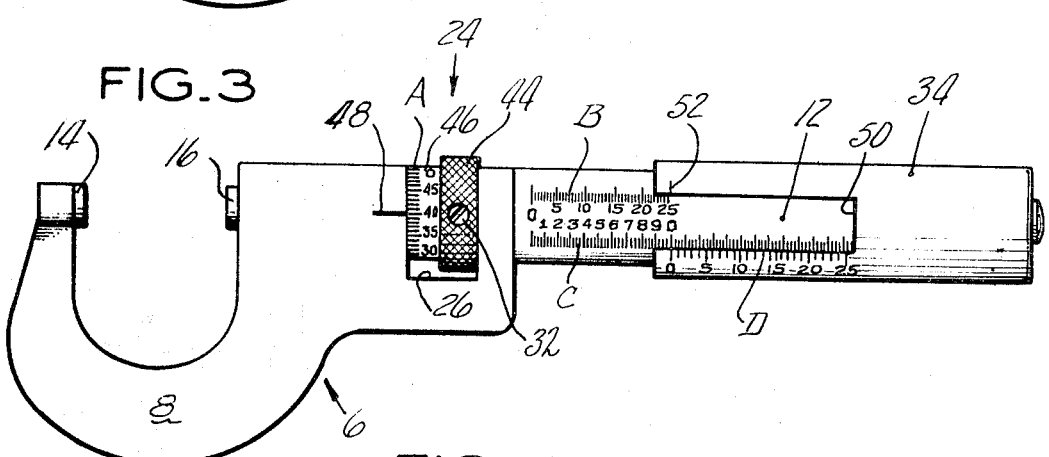
FIG. 3 is a side elevation of the micrometer of FIG. 1, wherein the face of the spindle is spaced from the anvil.
Figure 4:
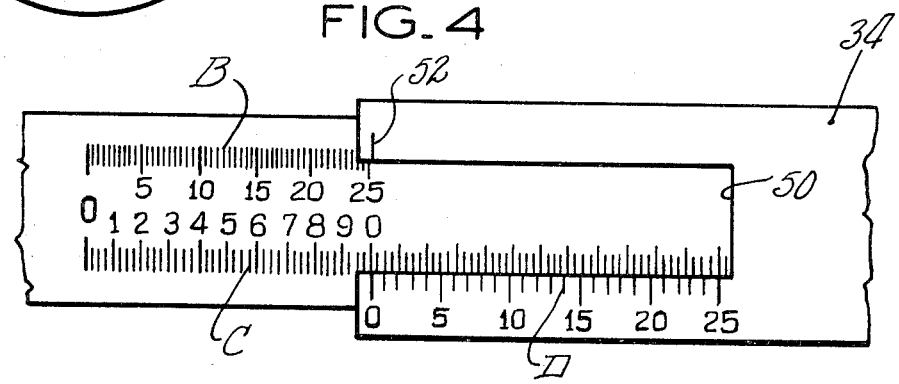
FIG. 4 is enlarged, fragmentary, side elevation of the micrometer of FIG. 1, showing the scales on the sleeve and thimble.

Turning now to FIGS. 2 to 4, it can be seen that the outer member 30 of floating nut 24 embodies an enlarged diameter portion 44 having a knurled surface, and a smaller diameter portion 46 having a scale A graduated in the usual manner in terms of a first unit of measurement according to the metric system. An index mark 48 is imprinted upon the frame 6 adjacent the scale A. Imprinted upon the sleeve 12 are two scales, respectively designated B and C, which are visible through a cutaway portion 50 of the thimble 34. Scale B is graduated in terms of the first unit of measurement, that is, the unit of measurement in which Scale A is graduated; the scale C is graduated in terms of a second unit of measurement. At the lower edge of the cutaway portion 50 of the thimble 34, a vernier scale D is provided, the vernier scale D being graduated in terms of the second unit of measurement. Also provided on the thimble 34 adjacent the outer edge of the cutaway portion 50 is an index mark 52.

Focusing attention on the scales A, B, C and D, the scale A is graduated in terms of the meter, which is the fundamental unit of length in the metric system. Each division on scale A represents 0.01 millimeters. The dimensional range of scale A is 0 – 0.50 millimeters. In scale B, which is also graduated in terms of millimeters, each division represents 0.5 millimeters. The range of scale B is 0 – 25 millimeters. Scale C is graduated in terms of feet, which is the fundamental unit of length in the English system. Each division on scale C represents 0.025 inches. The range of scale C is 0 – 1 inch. The vernier scale D is also calibrated in terms of inches, and in this scale each division represents 0.001 inches. It should be apparent that the illustrated micrometer is capable of providing readings in units of the English system or the metric system without necessitating any conversion from one unit to another.

OPERATION

The part to be measured is placed between the anvil and the face of the spindle. The floating nut 24 is then rotated until both the anvil 14 and spindle 16 contact the part. The metric measurement is ascertained by reading the position of index 52, with reference to the scale B, and adding to it the reading of scale A, as referenced to the index mark 48. The English equivalent measurement is easily read by noting the position of the zero mark on scale D and adding to the reading obtained therefrom the reading of the vernier scale D. As will be appreciated by those familiar with the operation of precision measuring gages, the reading of the vernier scale D is made by observing which division on the vernier scale D most exactly matches a division on the scale C.

It will be understood that while the invention has been shown and described as applied to a micrometer, the invention may find application in any precision screw assembly. Also, it will be appreciated that scales A and B may be calibrated in terms of the English system, and that scales C and D may be calibrated in terms of the metric system.

While only one embodiment of the invention is shown and described herein, it will be manifest to those skilled in the art that various modifications and rearrangements may be made in accordance with the teachings herein without departing from the spirit and scope of the invention, and that the same is not limited to the particular form herein shown and described. We thus intend to limit out invention only insofar as indicated by the scope of the appended claims.

We claim:

1. In a precision measuring device, the combination of:
   a frame having a hub portion;
   a spindle mounted for longitudinal movement within the frame;
   a plurality of threads on the spindle;
   a rotatable drive member mounted in the frame in engagement with the threads for longitudinally moving the spindle;
   a thimble secured to the spindle to move in unison therewith for longitudinal movement over the hub portion;
   a first scale on the rotatable drive member graduated in a first unit of measurement;
   a second scale on the hub portion graduated in the first unit of measurement;
   a third scale on the hub portion graduated in a second unit of measurement; and
   a vernier scale on the thimble graduated in the second unit of measurement.

2. The combination of claim 1, further including:
   means to bias the rotating member against the frame.

3. The combination of claim 1, further including:
   means to prevent rotation of the spindle relative to the frame.

* * * * *